United States Patent
Teng et al.

(10) Patent No.: US 11,938,706 B1
(45) Date of Patent: Mar. 26, 2024

(54) NON-ADHESIVE DETACHABLE PROTECTIVE FILM

(71) Applicant: Shenzhen Baoye Industrial Co., Ltd, Shenzhen (CN)

(72) Inventors: Xin Teng, Shenzhen (CN); Zhijun Deng, Shenzhen (CN)

(73) Assignee: SHENZHEN BAOYE INDUSTRIAL CO., LTD, Shenzhen (CN)

( * ) Notice: Subject to any disclaimer, the term of this patent is extended or adjusted under 35 U.S.C. 154(b) by 0 days.

(21) Appl. No.: 18/187,533

(22) Filed: Mar. 21, 2023

(30) Foreign Application Priority Data

Nov. 4, 2022 (CN) .......................... 202222937013.4

(51) Int. Cl.
| | |
|---|---|
| *B32B 3/02* | (2006.01) |
| *B32B 7/05* | (2019.01) |
| *B32B 7/06* | (2019.01) |
| *B32B 7/14* | (2006.01) |
| *B32B 27/08* | (2006.01) |
| *B32B 27/20* | (2006.01) |
| *B32B 27/28* | (2006.01) |
| *B32B 27/30* | (2006.01) |
| *B32B 27/40* | (2006.01) |

(52) U.S. Cl.
CPC .................. *B32B 3/02* (2013.01); *B32B 7/05* (2019.01); *B32B 7/06* (2013.01); *B32B 7/14* (2013.01); *B32B 27/08* (2013.01); *B32B 27/20* (2013.01); *B32B 27/283* (2013.01); *B32B 27/304* (2013.01); *B32B 27/40* (2013.01); *B32B 2250/03* (2013.01); *B32B 2327/06* (2013.01); *B32B 2375/00* (2013.01); *B32B 2383/00* (2013.01); *B32B 2457/20* (2013.01)

(58) Field of Classification Search
CPC .... B32B 3/02; B32B 7/05; B32B 7/06; B32B 7/14; B32B 27/08; B32B 27/20; B32B 27/283; B32B 27/304; B32B 27/40; B32B 2250/03; B32B 2327/06; B32B 2375/00; B32B 2383/00; B32B 2457/20
USPC ........................................................... 428/192
See application file for complete search history.

(56) References Cited

U.S. PATENT DOCUMENTS

| | | | | |
|---|---|---|---|---|
| 2008/0019616 | A1* | 1/2008 | Hotta | G06F 3/0421 |
| | | | | 382/187 |
| 2013/0142981 | A1* | 6/2013 | Huang | C09J 7/22 |
| | | | | 428/41.8 |
| 2017/0094039 | A1* | 3/2017 | Lu | H04M 1/185 |

* cited by examiner

*Primary Examiner* — Betelhem Shewareged

(74) *Attorney, Agent, or Firm* — Getech Law LLC; Jun Ye

(57) ABSTRACT

The utility model discloses a non-adhesive detachable protective film, including the film body attached to the screen. The aforesaid film body has a soft resin layer fixed on the inner border; in which, the soft resin layer is set in strips along the edge of the border of the film body, forming a frame-sticking structure. Between the aforesaid soft resin layer and the film body, there is an adhesive layer for bonding and fixing; in which, the former one is pressed against the screen surface under pressure extrusion, forming a pressure-attached fixing structure with the screen surface. The utility model uses soft resin layer that allows the film body to be attach to the screen by extrusion, without using adhesive film. Besides, the film surface will not stick to dust when it is attached and removed in high frequency, and the fitting effect will not be reduced by repeated use.

9 Claims, 1 Drawing Sheet

NON-ADHESIVE DETACHABLE PROTECTIVE FILM

TECHNICAL FIELD

The utility model relates to the technical field of protective film, in particular, a non-adhesive detachable protective film.

BACKGROUND TECHNOLOGY

Nowadays, cell phones, tablets and other electronic devices are very popular, and it is common to put film on the surface of the screen. In addition to disposable film, most of the films used repeatedly are protective films with adhesive force. When used in high frequency, multiple attaching and removal of the film may make the fitting surface dusty; thereby the adhesive force will slowly decrease, and finally no adhesive force, and the film cannot be effectively attached. Besides, the material with adhesive force will slowly transfer to the surface of the object to be attached, which is difficult to remove. In the end, the adhesive force will decrease after repeated use, and the cleanliness and beauty of the surface will be affected as well.

CONTENT OF UTILITY MODEL

The purpose of the utility model is to provide a non-adhesive detachable protective film to solve the problems raised in the Background Technology.

In order to achieve the above-mentioned purpose, the utility model provides the following technical solutions.

The utility model discloses a non-adhesive detachable protective film, including the film body attached to the screen. The aforesaid film body has a soft resin layer fixed on the inner border; in which, the soft resin layer is set in strips along the edge of the border of the film body, forming a frame-sticking structure. Between the aforesaid soft resin layer and the film body, there is an adhesive layer for bonding and fixing; in which, the former one is pressed against the screen surface under pressure extrusion, forming a pressure-attached fixing structure with the screen surface.

In a further embodiment, the aforesaid film body is fixed with an anti-adhesive matte layer or an absorbent resin layer on the inner side of the film body, which is located between the film body and the screen.

In a further embodiment, a color substrate layer covering the soft resin layer is also provided between the aforesaid soft resin layer and the adhesive layer or on the surface of the aforesaid film body.

In a further embodiment, the contact surface of the aforesaid color substrate layer and the aforesaid soft resin layer is a matte surface; the aforesaid soft resin layer and the matte surface are fixed together by a strong glue.

In a further embodiment, the aforesaid color substrate layer is aligned with the color of the screen.

In a further embodiment, the aforesaid film body has a puller sticker fixed on a corner of the outer surface of the film body.

In a further embodiment, the aforesaid film body can be used as a handwriting film or a privacy protection film.

In a further embodiment, the aforesaid soft resin layer material is TPU, silicone or polyvinyl chloride.

In a further embodiment, the aforesaid film body is provided with a storage plate near the bottom of the soft resin layer.

Compared with the prior art, the beneficial effect of the utility model is as follows:

The utility model uses soft resin layer that allows the film body to be attached to the screen by extrusion, without using adhesive film. Besides, the film surface does not stick to dust when the film is attached and removed in high frequency, and the fitting effect is not reduced by repeated use.

DESCRIPTION OF THE DRAWING

FIG. 1 is a schematic diagram of the structure of this patent.

In the FIGURE: 1. film body; 2. adhesive layer; 3. color substrate layer; 4. soft resin layer; 5. screen.

SPECIFIC IMPLEMENTATION

In the description of the utility model, it should be noted that unless otherwise specified and limited, the terms "install", "connected", "connection" should be understood in a broad sense. For example, it may be a fixed connection, a detachable connection, or a one-piece connection; it may be a mechanical connection or an electrical connection; it may be a direct connection or an indirect connection through an intermediate medium; or it may be a connection within two components.

For a person of ordinary skill in the art, the specific meaning of the aforesaid terms in the present utility model can be understood by specific circumstances.

In the following, the technical solutions in the utility model embodiments will be clearly and completely described in conjunction with the accompanying drawings in the utility model embodiments. Obviously, the described embodiments are only a part of the utility model embodiments, not all of them.

Based on the embodiments in the utility model, all other embodiments obtained by a person of ordinary skill in the art without making creative labor fall within the scope of protection of the utility model.

This application uses the creeping nature of the soft resin. After the film body 1 is aligned, a pressure is applied to the surface of the film with an external force, and the air between the surface of the soft resin and the screen is extruded. Under the pressure force of atmospheric pressure, the protective film as a whole is attached; the film can be bonded when no external force is applied to tear it away.

As shown in FIG. 1, the non-adhesive detachable protective film includes a film body 1 attached to the screen; the film body is a handwriting film or a privacy protection film, not a disposable film. It is mainly used for a special purpose.

The soft resin layer 4 is fixed on the inner frame of the film body 1, and the soft resin layer 4 is set in strips along the edge of the border of the film body 1 to form a frame-sticking structure, which can be set on all four sides, or on both sides or one side. There is an adhesive layer 2 for bonding between the soft resin layer 4 and the film body 1; the soft resin layer 4 is pressed against the surface of the screen 5 under pressure, forming a pressure-attached structure with the surface of the screen 5. In fact, there is a near vacuum between the two contact surfaces, as long as a suction force of sufficient magnitude is generated.

The soft resin layer 4 in this implementation is made of TPU, silicone or polyvinyl chloride. The soft resin layer 4 is soft, and the surface is not sticky. When it is attached to a smooth screen surface, you can press it hardly to squeeze out the gas and gaps on the contact surface, thereby forming a near vacuum; so that a large suction force is generated between the soft resin layer 4 and the smooth screen 5 surface, thus fixing the film body 1 to the screen 5. When it is not in use, slowly lift the soft resin layer 4 from one corner and let the air enter the contact surface. In this way, it is easy to separate the two and remove the film. The surface of the soft resin layer 4 of the utility model is not sticky, so it will not get dusty and has a long reusable life. Besides, washing with water or wiping with wet wipes will not affect its function; the suction force will not diminish and it will not smudge the screen.

In this implementation, there is also an anti-adhesive matte layer or absorbent resin layer (not shown in the FIGURE) fixed on the inner side of the film body 1. The anti-adhesive matte layer or absorbent resin layer is located between the film body 1 and the screen 5, which can be located in the middle of the frame sticker or extended outward to laminate with the soft resin layer 4. Because there are inevitably water stains and vapor on the surface of the screen, the film body and the screen surface are prone to be attached together because of these water stains or vapor, forming multiple spots of lamination, which will affect its use effect and appearance. If a layer of anti-adhesive matte layer or absorbent resin layer is added, such problem can be avoided. The anti-adhesive matte layer has irregular tiny bumps on the surface, making it difficult for water stains and water vapor to form a vacuum fitting surface; while the absorbent resin layer can directly absorb water stains and water vapor, also avoiding the partial fitting of the film body 1 and screen 5.

A color substrate layer covering the soft resin layer is also provided between the soft resin layer 4 and the adhesive layer 2 or on the surface of film body 1. The color substrate layer 3 in this implementation is of the same color as the screen 5, and is mainly used to cover the shadow and color generated by the soft resin layer 4, making the surface look more beautiful.

The contact surface of the color substrate layer 3 and the soft resin layer 4 is a matte surface, and the soft resin layer 4 and the matte surface are fixed together by a strong glue. The matte surface makes the color substrate layer and the soft resin layer bond more firmly and prevents the separation of the color substrate layer 3 and the soft resin layer 4 when the film body 1 is removed. There is a storage plate (not shown in the FIGURE) on the film body 1 near the bottom of the soft resin layer 4, so that the film can be stored when it is removed.

A puller sticker (not shown in the FIGURE) is attached to one corner of the outer surface of the film body 1 to facilitate pulling down the film as a whole. When the film is not in use, an external force is applied to break the pressure between the soft resin layer and the screen to remove the film body 1 as a whole, and there is no need to protect the soft resin layer 4 after removal. The soft resin layer 4 does not stick to dust; if there is dust on the soft resin surface, the dust can be simply wiped with a cloth. The film is designed for multiple use.

The utility model uses soft resin layer that allows the film body to be attached to the screen by extrusion, without using adhesive film. Besides, the film surface does not stick to dust when it is attached and removed in high frequency, and the fitting effect is not reduced by repeated use.

This film is mainly used as handwriting film or privacy protection film. The handwriting film is only used when writing; when watching the video, you need to remove it. The privacy protection film is only used when you don't want people to see the content of the screen when using the screen; when used alone, it will affect light transmission and needs to be removed.

To a person skilled in the art, it is clear that the utility model is not limited to the details of the aforesaid exemplary embodiments, and is capable of being implemented in other specific forms without departing from the spirit or essential features of the utility model. Therefore, from either point of view, the embodiments should be regarded as exemplary and non-limiting. The scope of the utility model is limited by the appended claims, not by the aforesaid description, and is therefore intended to encompass all variations that fall within the meaning and scope of the equivalent elements of the claims within the utility model. Any appended markings in the claims should not be considered as limiting the claims involved.

Furthermore, it should be understood that although the instruction is described based on the implementation, not each embodiment contains only one individual technical solution. The instruction is described in this way only for clarity. The skilled person in the art should take the instruction as a whole, and the technical solutions in all embodiments can also be properly combined to form other embodiments can be understood by the skilled person in the art.

What is claimed is:

1. A non-adhesive detachable protective film, comprising: a film body attached to a screen; the aforesaid film body has a soft resin layer, which is not sticky in nature, fixed on the inner border; in which, the soft resin layer is set in strips along the edge of the border of the film body, forming a frame-sticking structure; between the aforesaid soft resin layer and the film body, there is an adhesive layer for bonding and fixing; in which, the soft resin layer is pressed against a surface of the screen via pressure extrusion, forming a pressure-attached fixation with the surface of the screen.

2. The non-adhesive detachable protective film according to claim 1, characterized in that: the aforesaid film body is further fixed with an anti-adhesive matte layer or an absorbent resin layer on the inner side of the film body, which is located between the film body and the screen.

3. The non-adhesive detachable protective film according to claim 1, characterized in that: a color substrate layer covering the soft resin layer is also provided between the aforesaid soft resin layer and the adhesive layer or on the surface of the aforesaid film body.

4. The non-adhesive detachable protective film according to claim 3, characterized in that: the contact surface of the aforesaid color substrate layer facing the aforesaid soft resin layer is a matte surface; and the aforesaid soft resin layer and the matte surface of the color substrate layer are fixed together by a strong glue.

5. The non-adhesive detachable protective film according to claim 3, characterized in that: the aforesaid color substrate layer is of the same color as the screen.

6. The non-adhesive detachable protective film according to claim 1, characterized in that: the aforesaid film body has a puller sticker fixed on a corner of the outer surface of the film body.

7. The non-adhesive detachable protective film according to claim 1, characterized in that: the aforesaid film body can be used as a handwriting film or a privacy protection film.

8. The non-adhesive detachable protective film according to claim 1, characterized in that: the aforesaid soft resin layer material is TPU, silicone or polyvinyl chloride.

9. The non-adhesive detachable protective film according to claim 1, characterized in that: the aforesaid film body is provided with a storage plate near the bottom of the soft resin layer.

* * * * *